United States Patent [19]

Plumat et al.

[11] 3,816,222

[45] June 11, 1974

[54] METHOD FOR PREPARING VITREOUS BODY BY DIFFUSION OF IONS THROUGH A COATING LAYER

[75] Inventors: Emile Plumat, Gilly; Francois Toussaint, Lodelinsart, both of Belgium

[73] Assignee: Glaverbel S.A., Watermail, Belgium

[22] Filed: Aug. 2, 1971

[21] Appl. No.: 168,491

Related U.S. Application Data

[63] Continuation of Ser. No. 724,597, April 26, 1968, abandoned.

[30] Foreign Application Priority Data

Apr. 27, 1967 Luxembourg.......................... 53536

[52] U.S. Cl............................. 161/1, 65/30, 65/33, 65/60
[51] Int. Cl...... C03c 15/00, C03b 29/00, B44f 1/00

[58] Field of Search................. 65/33, 30, 60; 161/1

[56] References Cited
UNITED STATES PATENTS

| | | | |
|---|---|---|---|
| 3,384,508 | 5/1968 | Bopp et al. .......................... | 65/33 X |
| 3,464,880 | 2/1969 | Rinehart ............................. | 65/33 X |
| 3,573,073 | 3/1971 | Duke et al. ............................. | 65/33 |
| 3,585,053 | 6/1971 | Rittler..................................... | 65/33 |
| 3,586,521 | 6/1971 | Duke ..................................... | 65/33 |
| 3,723,080 | 3/1973 | Howell................................... | 65/30 |

*Primary Examiner*—Frank W. Miga
*Attorney, Agent, or Firm*—Spencer & Kaye

[57] ABSTRACT

A process, and a body treated in accordance therewith, for adding a layer to a body of vitreous, vitrocrystalline or ceramic material which layer is subsequently at least partially crystallized. Ions are diffused into the body and through this layer.

34 Claims, No Drawings

METHOD FOR PREPARING VITREOUS BODY BY DIFFUSION OF IONS THROUGH A COATING LAYER

CROSS-REFERENCE TO RELATED APPLICATION

This application is a continuation of application Ser. No. 724,597 filed Apr. 26, 1968 now abandoned.

BACKGROUND OF THE INVENTION

The present invention relates to processes for strengthening vitreous, vitrocrystalline and ceramic bodies.

It is known that glass can be tempered chemically by causing metal ions to enter exterior layers of the glass from a contacting medium under suitable conditions. Two types of chemical tempering processes can be distinguished. In one type, an ion exchange between the glass and the contacting medium takes place at a temperature sufficiently high for stress relaxation to occur in the glass and the ions entering the glass are such as to impart a lower coefficient of thermal expansion to the external glass layers. In the other type of chemical tempering process, ions in exterior layers of the glass are replaced by larger ions and the ion exchange is effected while the exterior glass layers are at a temperature below the annealing point (corresponding to a viscosity of $10^{13.2}$ poises) so that stress relaxation will not occur or will do so in a limited way only.

The tensile strength of glass can be very considerably increased by a chemical tempering treatment but the process does not incrase the surface hardness of the glass to any material extent, if at all.

SUMMARY OF THE INVENTION

It is a main object of the present invention to produce a body of substantial tensile strength and a surface hardness substantially greater than that of the glass body.

Another object is to provide a process which can also be usefully applied starting with a body of vitrocrystalline or ceramic material.

These objects and others ancillary thereto are accomplished in accordance with preferred embodiments of the invention wherein compressive stresses are produced in surface layers of a vitreous, vitrocrystalline or ceramic body by a chemical tempering treatment in which ion exchange takes place between surface layers of the body and a liquid or gaseous medium, through a coating layer adherent to said body and applied thereto prior to the chemical tempering treatment. This layer forms, or is modified after the start of the chemical tempering treatment to form, a crystalline or partly crystalline coating with a surface hardness greater than that of the coated surface.

The invention can be applied with particular advantage for strengthening glasses of ordinary composition, i.e., glasses formed from easily available inexpensive constituents, e.g. silica, soda, lime and feldspar.

DESCRIPTION OF THE PREFERRED EMBODIMENTS

The chemical tempering treatment performed in carrying out the invention is preferably a treatment involving the exchange of alkali metal ions, e.g. the substitution of potassium or lithium ions for sodium ions in the body undergoing treatment.

The solid coating present on the body at the commencement of the chemical tempering process may have the same physical and chemical composition as the substance initially applied to the body or the solid coating initially formed may be subjected to some modification in situ preparatory to the commencement of chemical tempering. For example, the body may be initially coated with an amorphous substance or substances which can then be converted to form a crystalline or crystallizable coating. The conversion may involve reaction between ingredients of the initial coating or between a substance or substances in the initial coating and another substance brought into contact with the coating. These possibilities are of potential importance because there is as a result a wide selection of substances from which an initial thin layer adherent to the body can be formed. In general, adherent coatings can be formed more easily by amorphous than by crystalline substances.

Crystallization in the coating may occur at least in part during the chemical treatment, e.g. during immersion of the body in a chemical tempering bath, such as a bath composed of a molten salt or salts. The bath may include an ingredient for promoting crystallization in the coating. Thus, crystallization in an aluminum-containing coating can be promoted by an agent selected from the group: Ti, Mn, Mg, Co, Cu, Ni, Zn, Cr. Crystallization in a zirconium-containing coating can be promoted by an agent selected from the group: Fe, Ca, Mg, Ti and rare earths. For silicon-containing coatings, the crystallization agent can be a halogen, and suitable agents for promoting crystallization in titanium-containing coatings are: Zn, Cd, Bi, Ni, Al, Cr, the halogens and water vapor. The crystallization-promoting agents, if added to a bath of medium in atomic or molecular form, may become transformed, sometimes spontaneously, into simple or compound ions by reaction with the medium, without loss of their activity. The agents can also be introduced in the form of compounds, e.g. sulphates, chlorides or oxides.

In general, crystallization tends to be promoted by the presence of lithium ions, but their concentration should not exceed 2%. It is also possible to form the chemical composition of the final coating by reaction between one or more initially applied substances and an ingredient of the contacting medium, such as the bath of molten salt or salts, used for the chemical tempering treatment. In such a process, the crystallization may also occur at least in part during the chemical tempering treatment or it may be brought about subsequently, depending on the composition of the coating. By way of example, the body may be initially coated with an element by a conventional coating technique, such as evaporation in vacuo, cathode sputtering, or hydrolysis, and the coated article can then be immersed in a bath of molten salt in which, while the ion exchange proceeds, the coating is converted to its final chemical composition and crystallization takes place.

In various tests it has been found that there is a tendency for the ion exchange to proceed more rapidly through a coating which is non-crystalline, and from this point of view there is an advantage in carrying out the invention so that at least some of the crystallization is deferred until after completion of the ion exchange treatment.

The effect of carrying out the present invention is that the properties of the vitreous or other body are improved more than can be predicted from the known effects of chemical tempering on the one hand and the provision of a relatively hard surface coating on the other. It is surprising that the tensile strength is more improved by carrying out the ion exchange through the coating. Possibly this is, in some cases, due to entry of some of the ion-donating medium or of the ions into the coating so that compressive stresses are set up in the coating during cooling. This appears probable, e.g., when the ions donated to the glass or other body are provided by molten salts, such as KCl or $LiNO_3$, and molecules of the salt diffuse into the coating, and particularly if crystallization in the coating then ensues. However, the reason for the improvements are not wholly understood.

It is possible, depending on the composition of the coating layer and the ion-donating medium, not only that the composition of this layer will undergo some chemical modification as a result of the diffusion of ions, atoms or molecules into the coating from the contacting medium and/or as a result of the diffusion of ions into the coating from the coated body, but that a substance or substances entering the coating will participate in crystal formation in the layer, and this also has beneficial effects. In some processes it has been observed that, as a result of the simultaneous penetration of ions from the coated body into the coating on the one hand and the penetration of ions from the medium into the coated body and the coating on the other hand, the coated body and the coating became modified with formation of similar lattices of a vitreous nature in the one case and crystalline nature in the other, and that, as a result, the adherence of the coating to the body is considerably improved. In some processes ion exchange occurs between the medium and the coating as well as between the medium and the coated body, so that the coating itself is tempered.

In order to achieve a high degree of surface hardness, it is useful to form a coating comrising at least one crystalline phase formed by $Al_2O_3$ (corundum), SiC, $SiO_2$, $ZrB_2$, TiN, TaC, ZrC, TiC, AlB, $ZrO_2$, $B_4C$, $TiO_2$, zircon ($ZrSiO_4$), beryl ($Al_2Be_3Si_6O_{18}$) or topaz ($Al_2SiO_3$) $(F,OH)_2$, $Ta_2O_5$, $Y_2O_3$, $CeO_2$.

The ion exchange can be promoted by an electric field. This may be generated by a direct or alternating voltage and may extend through the body undergoing treatment between two quantities of molten salt in contact with opposite sides of the coated body. It suffices to use voltages of the order of several tens of volts.

This is disclosed, for example, in copending application, entitled Diffusion Methods for Improving the Properties of Materials, Ser. No. 724,597, filed Apr. 26, 1968, and corresponding to Luxembourg Patent application No. 53,499 filed Apr. 24, 1967 and British Patent application No. 58,384/67 filed Dec. 22, 1967.

Alternatively, or in addition, the ion exchange can be promoted by means of a substance which weakens the diffusion barrier, e.g. by countering the diffusion-inhibiting effects of the ions which diffuse into the bath of molten salt or other medium from the body undergoing treatment. Substances which can be used for weakening the diffusion barrier are, e.g., halogens, compounds providing alkaline earth metal ions, particularly calcium or magnesium ions, and substances which form complexes with ions migrating from the body, e.g. substances in the groups: Fe, Ni, $NH_4^+$, $CN^-$.

It is to be understood that the invention includes processes in which the ion exchange which takes place through a coating layer affects only a part of the total surface area of the body. For example, in the case of a sheet of glass, the invention includes a process in which only the edge surfaces of the sheet or only the edge surfaces and contiguous marginal portions of the major surfaces are coated and subjected to the chemical tempering treatment.

The invention includes a vitreous, vitrocrystalline or ceramic body which has at least one chemically tempered surface or surface portion covered by a coating with a a greater surface hardness than the coated body. In particular, the invention includes such a body in which there exists in a zone comprising the surface layers of the body and the contacting bottommost layers of the coating a continuous variation in the content of alkali metal ions originating from the glass and of ions derived from a substance other than that used for forming the coated body or the coating.

The following are examples of processes and materials according to the invention.

EXAMPLE I

A sheet of soda-lime glass of ordinary composition, formed from a batch containing as its main constituents 72.4% of $SiO_2$, 13.7% of $Na_2O$, 12.0% of CaO and 1.9% of $Al_2O_3$ (the percentage being by weight), and having a thickness of 25mm was introduced into a chamber and metallized in vacuo at a vacuum of $10^{-5}$ mm Hg. In the chamber the sheet of glass was coated on both surfaces with a layer of 350 A of $Al_2O_3$ by cathode sputtering using an aluminacoated electrode. The applied voltage was 3.2 kV; the current density was 20 $mA/cm^2$.

The deposited $Al_2O_3$ layer had a crystalline structure.

The sheet of glass thus treated was kept immersed for 40 hours in a bath of potassium nitrate at a temperature of 490°C.

During this phase of the treatment, potassium ions diffused through the $Al_2O_3$ layer and replaced sodium ions of the glass. The latter diffused towards the bath of potassium nitrate. In a comparative test, 15% by weight of $CaCl_2$ was introduced into the nitrate bath and this was found to counter the tendency for sodium ions in the bath to block the diffusion of the potassium ions.

After the 40 hour immersion period, the sheet of glass was removed from the nitrate bath and cooled in air to ambient temperature. The tensile strength of the sheet was found to be 130 $kg/mm^2$ and its Mohs surface hardness was 9. The Mohs surface hardness of the glass substrate was 5.5.

EXAMPLE 2

A layer of metallic aluminum was deposited on the surface of a sheet of glass of the same composition as the glass used in Example I by evaporation in vacuo. The metallic aluminum was carried by an electrically heated tungsten filament. The sheet of glass coated with the aluminum layer was then heated for one hour at a temperature of 450°C to transform the aluminum layer into $Al_2O_3$. The resulting layer had an amorphous structure. The glass thus treated was then immersed for 45 hours in a potassium nitrate bath as used in Example I but containing a chromium salt in sufficient concentration to provide 5% of Cr ions per 100 ions of potassium thereby to promote the crystallization of the $Al_2O_3$ layer. From the nitrate bath, potassium ions diffused into the glass through the $Al_2O_3$ layer and replaced sodium ions which diffused towards the bath. Also in the nitrate bath, the layer of amorphous $Al_2O_3$ acquired a crystalline structure so that its surface hardness increased. The Mohs surface hardness of the glass substrate was 5.5 and that of the corundum coating was 9.

Other crystallization-promoting agents which could be used in place of chromium, and with comparable results, are: titanium, magnesium, cobalt, copper, nickel, manganese, zinc. The concentrations of such elements in the bath should preferably not exceed 10% by weight.

EXAMPLE 3

A sheet of borosilicate glass of the following composition: $SiO_2$, 72.9%; $Na_2O$, 9.8%; $K_2O$, 0.1%; $CaO$, 0.4%; $MgO$, 0.2%; $Al_2O_3$, 6.2%; $B_2O_3$, 10.4% (percentages by weight) was introduced into a chamber in which the pressure was of the order of $10^{-5}$ mm Hg. In the chamber, a 75 m$\mu$ layer of silicon monoxide was deposited on the surfaces of the glass by thermal evaporation of silicon monoxide contained in a molybdenum crucible. The sheet thus treated was then heated in air to a temperature close to its softening temperature to transform the monoxide into a partially amorphous and partially crystalline silicon dioxide coating.

The sheet of glass was then immersed for 35 hours in a bath of molten cesium nitrate at a temperature of 520°C, to cause cesium ions to diffuse in the glass in substitution for sodium ions. To assist the diffusion, an alternating voltage of 200 volts was applied between the portions of the bath on either side of the sheet of glass. During the treatment in the bath, the crystallization of the silica progressed only slowly and did not hinder the diffusion of cesium ions into the coated glass.

After 19 hours' treatment in the nitrate bath, 5% by weight of barium chloride was added to the bath. The chlorine ions thus introduced into the bath had two effects during the remaining period of treatment in the bath. On the one hand, the chlorine ions promoted the crystallization of the $SiO_2$ layer; on the other hand, the chlorine ions increased the rate of diffusion of the cesium ions.

Upon conclusion of the period of treatment, the sheet of coated glass was removed from the bath and cooled in air. The tensile strength of the product was 110 kg/mm$^2$, and it had a Mohs surface hardness of 7. The Mohs surface hardness of the substrate was 5.2. It stood up very satisfactorily to severe abrasion tests and resisted chemical attack by HCl, $HNO_3$ and $H_2SO_4$.

EXAMPLE 4

A glass container was coated with a layer of $ZrB_2$ and chemically toughened in a bath of potassium nitrate. The glass was a soda-lime glass of similar composition to the glass used in Example I.

The inside and outside surfaces of the container were coated by evaporation in vacuo with a layer containing both zirconium and boron. The vaporization in vacuo of the two substances was performed simultaneously. The zirconium was vaporized from a tungsten filament. The boron was vaporized from a coating on an electrically heated carbon rod. The evaporation of the two substances was continued until a layer 1,000 A in thickness was obtained.

The container thus treated was then immersed for 25 hours in a bath of potassium nitrate kept at a temperature of 470°C.

3% by weight of titanium ions and 0.5% by weight of lithium ions (based on the weight of potassium ions in each case) were added to the bath. These elements promoted the crystallization of $ZrB_2$. Potassium ions were substituted for sodium ions in the glass. The $ZrB_2$ was formed and crystallized while the ion exchange proceeded.

The container thus treated had a tensile strength of 102 kg/mm$^2$ and a high degree of resistance to abrasion. Its Mohs surface hardness was 7.5 whereas the Mohs surface hardness of the substrate was 5.5.

Iron, calcium, magnesium and rare earths could be used in similar concentrations in place of titanium ions for promoting crystallization.

Hard layers of SiC, TiN, TaC, ZrC, TiC, AlB, $B_4C$, corundum and/or zircon can likewise be formed by evaporation in vacuo of their constituent elements followed by combination of the elements in situ to form a crystalline coating in the chemical toughening bath, and the formation of such coatings can also be promoted by the agents above referred to.

EXAMPLE 5

A vitrocrystalline body was dipped in a solution formed by adding to a solution of 200cc of titanium isopropyl in 200cc of water, 1 liter of ethyl alcohol and 80 grams of $FeCl_3 \cdot 6H_2O$. The body was withdrawn from the solution and bore a thin surface coating of the solution. The coating was dried at 150°C for 10 minutes and fired for 10 minutes at 450°C. The dried coating was composed of titanium and iron oxides and was amorphous.

The body thus coated was then toughened chemically in a potassium nitrate chemical tempering bath containing 6% by weight of zinc ions to promote crystallization of the oxide coating. During the tempering treatment the coating crystallized. The final Mohs surface hardness of the body was 7.6 whereas that of the substrate was 7.0.

Water vapor, halogens, cadmium, bismuth, nickel, aluminum can be used instead of zinc as the crystallization agent. It is preferable to use such agents in a concentration not exceeding 10% by weight. Crystallization can likewise be promoted by the presence of lithium ions in the tempering bath, e.g. in a proportion of 0.5% by weight based on the weight of the other alkali metal ions in the bath.

A similar wet coating process can be used for forming coatings composed of $SiO_2$ or a mixture of $TiO_2$ and $SiO_2$.

EXAMPLE 6

A sheet of soda-lime glass similar to that used in Example I was coated with a titanium layer on each of its surfaces. The thckness of the layer deposited was 250 A. The layer was deposited by evaporation in vacuo.

The coated sheet was then immersed in a bath of potassium nitrate at a temperature of 450°C and containing an agent for promoting crystallization. The nitrate bath performed three functions, viz: conversion of the titanium into titanium oxide, crystallization of the coating and chemical tempering of the coated sheet by ion exchange between the sheet and the bath, sodium ions in the glass being replaced by potassium ions. The Mohs surface hardness of the coated sheet was 8.6 whereas that of the glass substrate was 5.5.

The process according to the invention can be applied not only to ordinary glasses, where its use is particularly advantageous, but also to special glasses or ceramics, more particularly vitroceramics.

EXAMPLE 7

A sheet of soda-lime glass of the composition specified in Example I was coated by simultaneous cathode sputtering processes respectively using electrodes coated with alumina and boron, with a coating layer 5,000 A in thickness composed of 90% by weight of $Al_2O_3$ and 10% by weight of boron. The sheet was then treated in the same way as the coated sheet in Example I by immersion in a potassium nitrate bath, through which, however, nitrogen was bubbled. At the end of the treatment it was found that sodium ions in the coated surface ayers of the glass had become replaced by potassium ions and that a conversion of boron to boron nitride had taken place in the coating. Moreover, some nitrogen ions had penetrated into the glass sheet to a depth of 10 microns and had become converted to form aluminum nitride. The Mohs surface hardness of the sheet was 9 and its tensile strength was found to be 145 kg/mm².

It will be understood that the above description of the present invention is susceptible to various modifications, changes and adaptations, and the same are intended to be comprehended within the meaning and range of equivalents of the appended claims.

We claim:

1. A process for strengthening a vitreous, vitrocrystalline, or ceramic body containing a sufficient concentration of exchangeable ions in a surface layer thereof to make possible chemical tempering of the surface layer by ion exchange, the process comprising the steps of:
    coating onto at least a portion of said surface layer an adherent coating layer which permits ion exchange therethrough and is capable of being in an at least partly crystalline form which has a hardness greater than that of the surface layer;
    contacting the coating layer with a contacting medium containing ions which can penetrate through the coating layer and into at least the surface layer of the body in exchange for exchangeable ions in said surface layer and causing diffusion of ions in the medium through said coating layer and into at least the surface layer of said body in exchange for exchangeable ions in said surface layer to produce compressive stresses in and thus chemically temper said surface layer.

2. A process as defined in claim 1 which comprises modifying said coating layer after diffusion begins.

3. A process as defined in claim 1 comprising creating an electric field across the interfaces between the surface layer of the body and the medium for promoting diffusion.

4. A process as defined in claim 1 wherein the medium is a molten salt.

5. A process as defined in claim 4 wherein the molten salt comprises a crystallization-promoting agent.

6. A process as defined in claim 5 wherein the crystallization-promoting agent provides lithium ions.

7. A process as defined in claim 1 which comprises exposing said coating layer to a crystallization-promoting agent.

8. A process as defined in claim 1 wherein the coating layer contains aluminum, and further comprising promoting crystallization of the coating layer by a substance which is in the medium and which provides ions selected from the group consisting of those of Ti, Mn, Mg, Co, Cu, Ni, Zn, and Cr.

9. A process as defined in claim 1 wherein the coating layer contains zirconium and crystallization of the coating layer is promoted by a substance selected from the group consisting of Fe, Ca, Mg, Ti, and rare earths.

10. A process as defined in claim 1 wherein the coating layer contains silicon and crystallization of the coating layer is promoted by a halogen.

11. A process as defined in claim 1 wherein the coating layer contains titanium and crystallization of the coating layer is promoted by a substance selected from the group consisting of Zn, Cd, Bi, Ni, Al, Cr, a halogen, and water vapor.

12. A process as defined in claim 1 wherein the coating layer subsequent to diffusion comprises at least one crystalline phase formed by a member selected from the group consisting of $Al_2O_3$, SiC, $SiO_2$, $ZrB_2$, TiN, TaC, ZrC, TiC, AlB, $B_4C$, $TiO_2$, $ZrO_2$, $ZrSiO_4$, $Al_2Be_3Si_6O_{18}$, $(Al_2SiO_3)$ $(F,OH)_2$, $Ta_2O_5$, $Y_2O_3$ and $CeO_2$.

13. A process as defined in claim 1 wherein said body is soda-lime glass.

14. A process as defined in claim 1 wherein said medium includes a substance which provides alkali metal ions and the ion exchange is an exchange of alkali metal ions.

15. A process as defined in claim 1 wherein the body is soda-lime glass, the coating layer is $Al_2O_3$, the medium is potassium nitrate, and diffusion is caused by heating the glass.

16. A process according to claim 15 wherein the medium contains a crystallization-promoting agent selected from the group consisting of chromium, titanium, manganese, magnesium, cobalt, copper, nickel and zinc, and the agent is contained therein in an amount of at most 10 percent by weight.

17. A process as defined in claim 1 wherein the body is vitrocrystalline, the coating layer is amorphous titanium and iron oxides, and the medium is potassium nitrate.

18. A process as defined in claim 1 wherein the body is soda-lime glass, the coating layer is $Al_2O_3$ and boron, and the medium is potassium nitrate.

19. A process according to claim 1 for strengthening a vitreous, vitrocrystalline or ceramic body containing exchangeable ions comprising coating the body with an adherent layer of material different from that of the body prior to exchanging larger ions in the medium for smaller ions in said body through the coating layer and at least partially crystallizing the coating layer.

20. A process according to claim 1 wherein the body is a vitreous body.

21. A process according to claim 1 wherein the body is a vitrocrystalline body.

22. A process according to claim 1 wherein the body is a ceramic body.

23. A process according to claim 1 which consists essentially of:
coating onto at least a portion of the body a coating layer which is capable of being in an at least partly crystalline form;
contacting the coating layer with a contacting medium containing ions capable of penetrating through the coating layer and into at least a surface layer of the body in exchange for exchangeable ions in said body;
effecting ion exchange through said coating layer and between ions initially in the contacting medium and the exchangeable ions; and
providing said coating layer with a surface hardness greater than that of the coated surface of the body, said coating layer with greater surface hardness being at least partially crystalline.

24. A process according to claim 1 which comprises partially crystallizing the coating layer concurrently with the diffusion.

25. A process according to claim 1 which comprises at least partly crystallizing the coating layer after completion of the diffusion.

26. A process according to claim 1 which comprises separately applying constituents to the body and reacting the constituents together in situ to form the coating layer.

27. A process according to claim 1 which comprises modifying the coating layer by reacting at least one constituent in said coating layer with another substance during diffusion.

28. A process as defined in claim 27 wherein the resulting reaction is accompanied by crystallization in the coating layer.

29. A process according to claim 1 which comprises modifying the coating layer prior to effecting the diffusion.

30. A process according to claim 29 wherein the body is a borosilicate glass, the coating layer through which the diffusion is effected is of silicon dioxide, the medium is cesium nitrate, and said diffusion is effected by heating the glass.

31. A process according to claim 1 wherein the body is a soda-lime glass, the medium is potassium nitrate and the diffusion is effected through a $ZrB_2$ coating layer.

32. A process according to claim 1 wherein the body is a soda-lime glass, the medium is potassium nitrate and the diffusion is effected through a titanium oxide coating layer.

33. A process according to claim 1 which comprises imparting to the coating a hardness greater than that of the surface layer, the resulting coating being at least partially crystalline.

34. A vitreous, vitrocrystalline, or ceramic body strengthened according to the process defined in claim 1.

* * * * *

UNITED STATES PATENT OFFICE
CERTIFICATE OF CORRECTION

Patent No. 3,816,222                    Dated  June 11th, 1974

Inventor(s) Emile Plumat and Francois Toussaint

It is certified that error appears in the above-identified patent and that said Letters Patent are hereby corrected as shown below:

In the heading of the patent, line 7, change "Watermail" to --Watermael Boitsfort--, after line 14, insert --March 11, 1968 Great Britain...... 11,797-68 --;

Column 1, line 32, change "incrase" to --increase--;

Column 3, line 40, change "comrising" to --comprising--;

Column 4, line 35, change "aluminacoated" to --alumina-coated--;

Column 6, line 63, change "thckness" to --thickness--;

Column 7, line 24, change "ayers" to --layers--.

Signed and sealed this 22nd day of October 1974.

(SEAL)
Attest:

McCOY M. GIBSON JR.          C. MARSHALL DANN
Attesting Officer            Commissioner of Patents